United States Patent [19]

Froeschle et al.

[11] Patent Number: 4,981,309

[45] Date of Patent: Jan. 1, 1991

[54] ELECTROMECHANICAL TRANSDUCING ALONG A PATH

[75] Inventors: Thomas A. Froeschle, Southboro; Robert L. Maresca, Milford, both of Mass.; James A. Parison, Fitzwilliam, N.H.

[73] Assignee: Bose Corporation, Framingham, Mass.

[21] Appl. No.: 401,947

[22] Filed: Aug. 31, 1989

[51] Int. Cl.$^5$ .............................................. B60G 11/26
[52] U.S. Cl. .................................... 280/707; 280/840; 280/715
[58] Field of Search ................. 280/707, 840, 6.1, 715

[56] References Cited

U.S. PATENT DOCUMENTS 4,861,067  8/1989  Booher ............................... 280/707

Primary Examiner—Kenneth R. Rice
Attorney, Agent, or Firm—Fish & Richardson

[57] ABSTRACT

In a vehicle having a chassis and at least one wheel assembly, where the wheel assembly includes a wheel support member, a damping mass, a damping spring for connecting the damping mass to the wheel support member, and a mechanical resistive member in parallel with the damping spring, a suspension connecting the wheel assembly to the chassis, the suspension supporting the weight of the vehicle and isolating the wheel motion from the chassis motion, and at least one actuator for providing force between the wheel assembly and the chassis, the improvement provides a linear electric motor connected between the wheel assembly and the chassis, where the linear electric motor provides force between the wheel assembly and the chassis.

28 Claims, 7 Drawing Sheets

ELECTROMECHANICAL TRANSDUCING ALONG A PATH

The present invention relates in general to electromechanical transducing along a path and more particularly concerns an along-path, typically linear, controllable force source typically embodying novel apparatus and techniques for actively absorbing energy from a vehicle wheel assembly moving over a rough surface so as to facilitate significantly reducing forces transmitted to the vehicle body supported on the wheel assembly.

Conventional vehicle suspensions employ a spring and shock absorber to isolate wheel motion from body motion. Advances have been made in suspensions by making suspensions variable and adaptive to driving conditions. For example, it is known to use electrically controlled active suspension members, such as a hydraulic piston actuator containing gas or fluid whose pressure may be electrically controlled, to achieve a predetermined characteristic, such as a hard or soft ride, while avoiding bottoming.

A typical active control system uses wheel forces, car accelerations, or other vehicle parameters to determine when to open/close valves which allow fluid to flow, thereby moving the piston of the actuator in such a manner as to absorb shock.

According to the invention, in a vehicle having a chassis and at least one wheel assembly, where the wheel assembly includes a wheel support member, may include a damping mass, may include a damping spring for connecting the damping mass to the wheel support member, and may include a mechanical resistive member in parallel with the damping spring, a suspension connecting the wheel assembly to the chassis, the suspension supporting the weight of the vehicle and isolating the wheel motion from the chassis motion, and at least one actuator for providing force between the wheel assembly and the chassis, the improvement includes a controllable along-path electromechanical transducer connected between the wheel assembly and the chassis, where the controllable along-path electromechanical transducer provides controllable force between the wheel assembly and the chassis and may convert mechanical energy produced by mechanical movement into electrical energy that may be returned to a vehicle battery or otherwise used in the vehicle. An along-path electromechanical transducer has first and second elements relatively movable along a path between first and second ends as distinguished from a conventional motor having a stator and rotating armature. This combination including the damping mass allows control at all meaningful frequencies, including wheel resonance, while significantly reducing force transmission to the suspended mass without excessive energy dissipation.

In preferred embodiments the controllable along-path electromechanical transducer is a linear multipole motor with salient poles.

The improvement may further include a load-leveling device connected between the wheel assembly and the chassis, the load-leveling device providing force between the wheel assembly and the chassis to compensate for the weight of the loaded vehicle where the load-leveling device may include an air bag.

Numerous other features and advantages of the invention will become apparent from the following specification when read in conjunction with the accompanying drawings in which.

Figure 1:
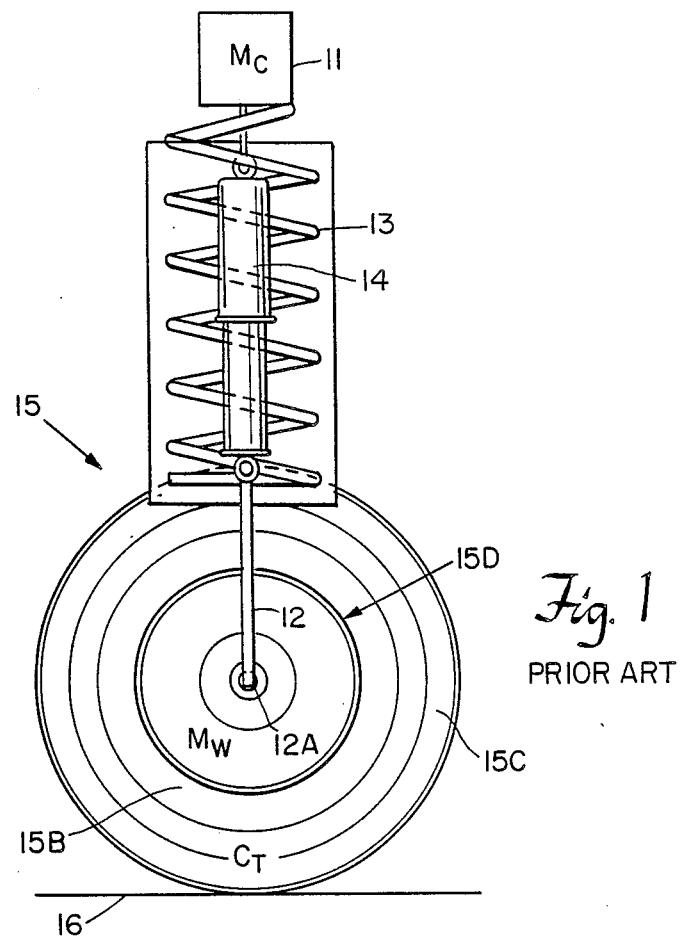
FIG. 1 is a combined block-diagrammatic representation of a typical automobile wheel suspension.

With reference now to the drawing and more particularly FIG. 1 thereof, there is shown a combined block-diagrammatic representation of a typical prior art wheel suspension. The sprung mass of the vehicle 11, typically comprising about one-fourth of the mass of the vehicle including the frame and components supported thereon, is connected to wheel assembly 12 by spring 13 in parallel with shock absorber 14. Wheel support assembly 12 carries on axle 12A wheel 15 including hub 15B and tire 15C. The wheel, brake assembly and wheel support assembly are characterized by an unsprung mass $M_w$. The brake assembly may be a part of the unsprung mass. Tire 15C has a compliance $C_T$. Tire 15C is shown supported on road 16. Spring 13 is characterized by a compliance $C_S$, and shock absorber 14 is characterized by a mechanical resistance $R_{SH}$. In an active system, the shock absorber is replaced by an actuator which responds according to commands from a control system (not shown).

Figure 2:
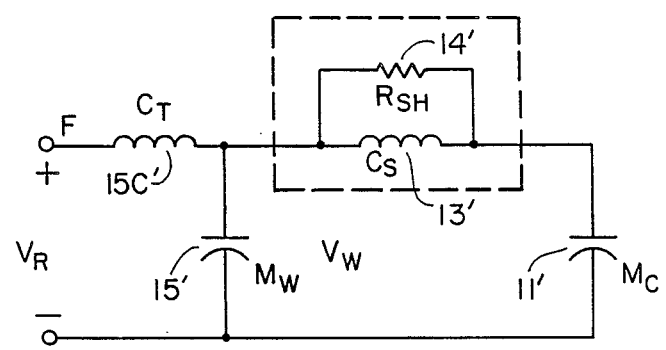
FIG. 2 is a schematic circuit diagram of the mechanical system of FIG. 1.

Referring to FIG. 2, there is shown a schematic circuit diagram of the mechanical system of FIG. 1. $V_R$ represents the rate of change of the elevation of the road at the point of contact with the surface of tire 15C and is applied to the tire compliance 15C' in series with the spring compliance 13' in series with the vehicle sprung mass portion 11'. The spring compliance 13' is shunted by the shock resistance 14'. The series combination of compliance 13' in shunt with the shock resistance 14' and the sprung mass 11' is shunted by the wheel unsprung mass 15'.

This mechanical circuit is characterized by resonances where the tire compliance $C_T$ resonates with the unsprung mass $M_w$, and the spring compliance, $C_S$, resonates with the sprung mass, $M_c$.

Figure 3:
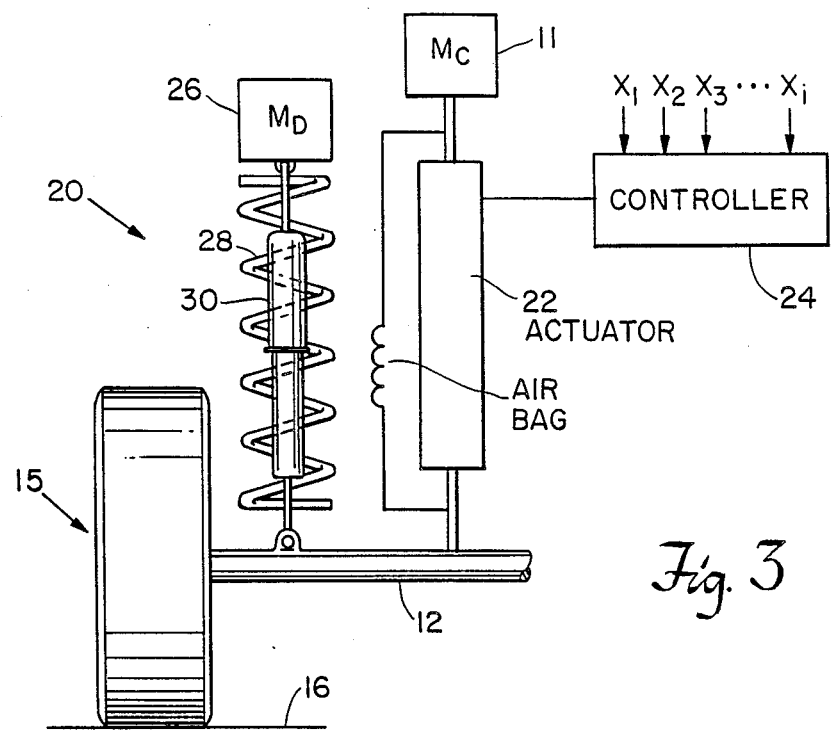
FIG. 3 is a combined block-diagrammatic representation of an active vehicle wheel assembly according to the invention.
Figure 3A:
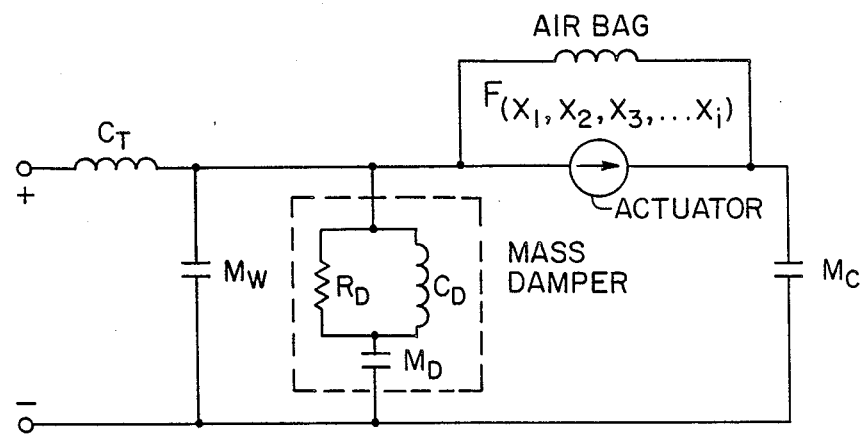
FIG. 3A is a schematic circuit diagram of the mechanical system of FIG. 3.

Referring to FIG. 3, there is shown a combined block-diagrammatic representation of a system 20 according to the invention incorporating an active vehicle suspension actuator and a damping assembly. Sprung mass portion 11 is connected to wheel support member 12 by active suspension actuator 22. Active suspension actuator 22 is electrically controlled by electronic controller 24. A damping assembly including damping mass 26 is connected to wheel support member 12 by damping spring 28 in parallel with damping resistance 30, which may be a conventional shock absorber. FIG. 3A is a schematic circuit diagram of the system of FIG. 3.

Active suspension actuator 22 includes linear electric motor 32 (shown in FIG. 4), i.e., a device which converts electrical energy into mechanical work along a path, typically a straight line, without an intermediate rotary motion. Linear electric motor 32, with appropriate commutation controls, is a controllable force source which for a constant control signal, maintains a constant force independent of position or velocity between the wheel assembly and the chassis. Any variation in force that is desired may be effected by correspondingly varying the control signal.

While it is convenient to refer to the electromechanical transducer as an electric motor, it is to be understood that electric motor 32 embodying this transducer may also function as a generator to convert mechanical work into electrical energy that may charge the vehicle battery or otherwise usefully energize vehicle electrical components.

In a preferred embodiment, motor 32 has multiple poles; i.e., the motor employs a magnetic field structure, produced by e.g., permanent magnets, field windings or induction, which has two or more field reversals over the normal range of travel. Motor 32 is preferably arranged to maximize the mechanical power it can provide for a given electrical power input while minimizing moving mass, e.g., by using salient-poles.

To reduce the D.C. power delivered to motor 32 for supporting the steady weight of the vehicle, a separate load leveling system, e.g., a conventional air-bag system having a compressor, height sensor, and controllable valve, may be employed. To minimize the energy stored in the wheel-damper system, the mass of the motor part connected to the wheel support member is as low as practical.

Figure 4:
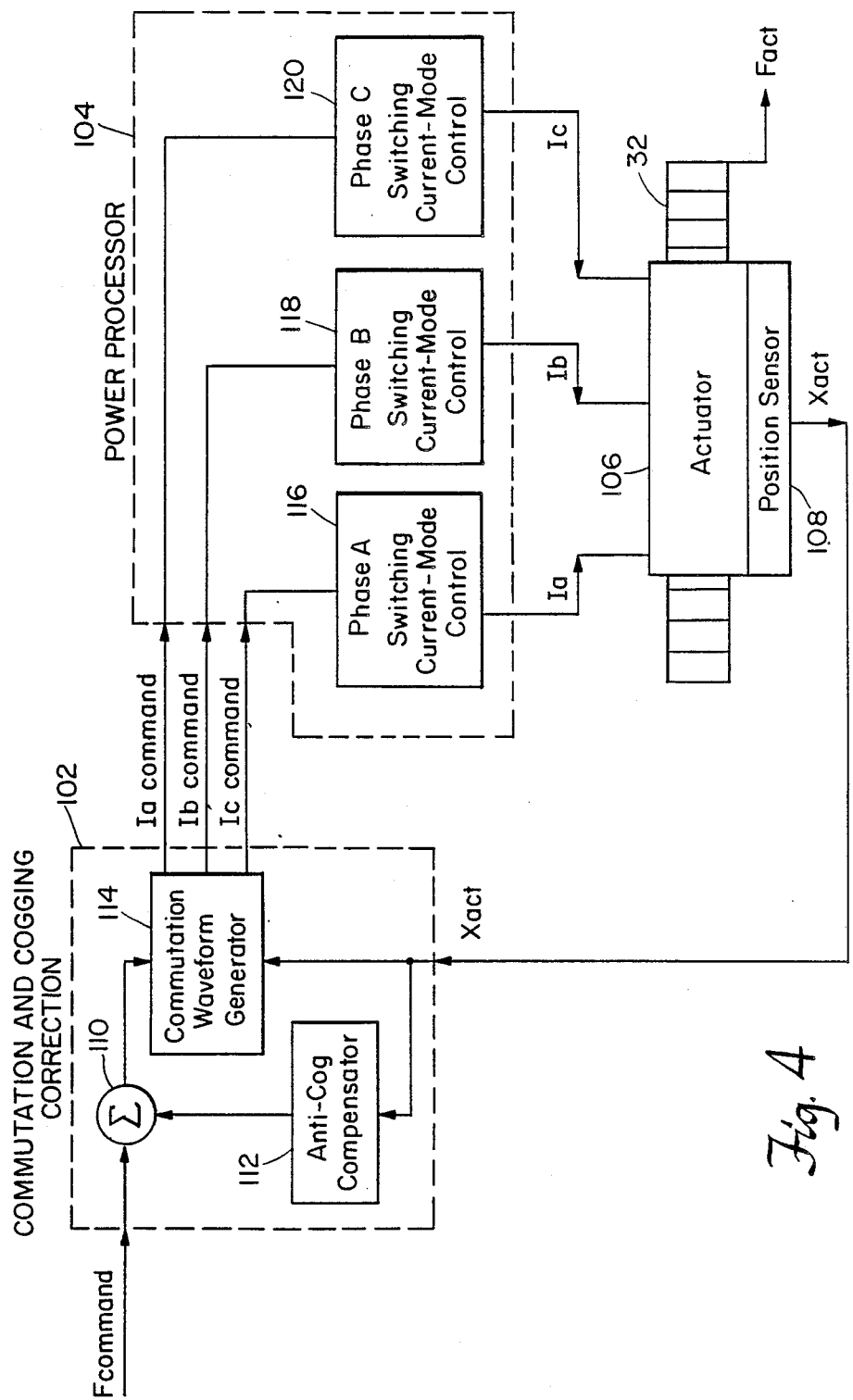
FIG. 4 is a schematic diagram of a motor controller of the FIG. 3 active vehicle wheel assembly.

With reference now to FIG. 4 there is shown a schematic diagram of motor controller 24. Electronic controller 24 for linear electric motor 32 includes commutation and cogging correction circuit 102 and power processor 104. Cogging forces are rectilinear forces, dependent on position, between relatively movable motor members with no current applied to the motor. Motor 32 includes position sensor 106 which detects the relative position between relatively movable motor members.

Correction circuit 102 includes summer 110 which adds the commanded signal with the output of anti-cog compensator 112, which is a function of the output from position sensor 106. The output of position sensor 106 also energizes commutation waveform generator 114, which receives the output of summer 110 and outputs three command control signals, $I_a$, $I_b$, $I_c$, to power processor 104. Power processor 104 includes three switching current mode control circuits 116, 118, 120 which provide the inputs to linear motor 32.

Figure 5:
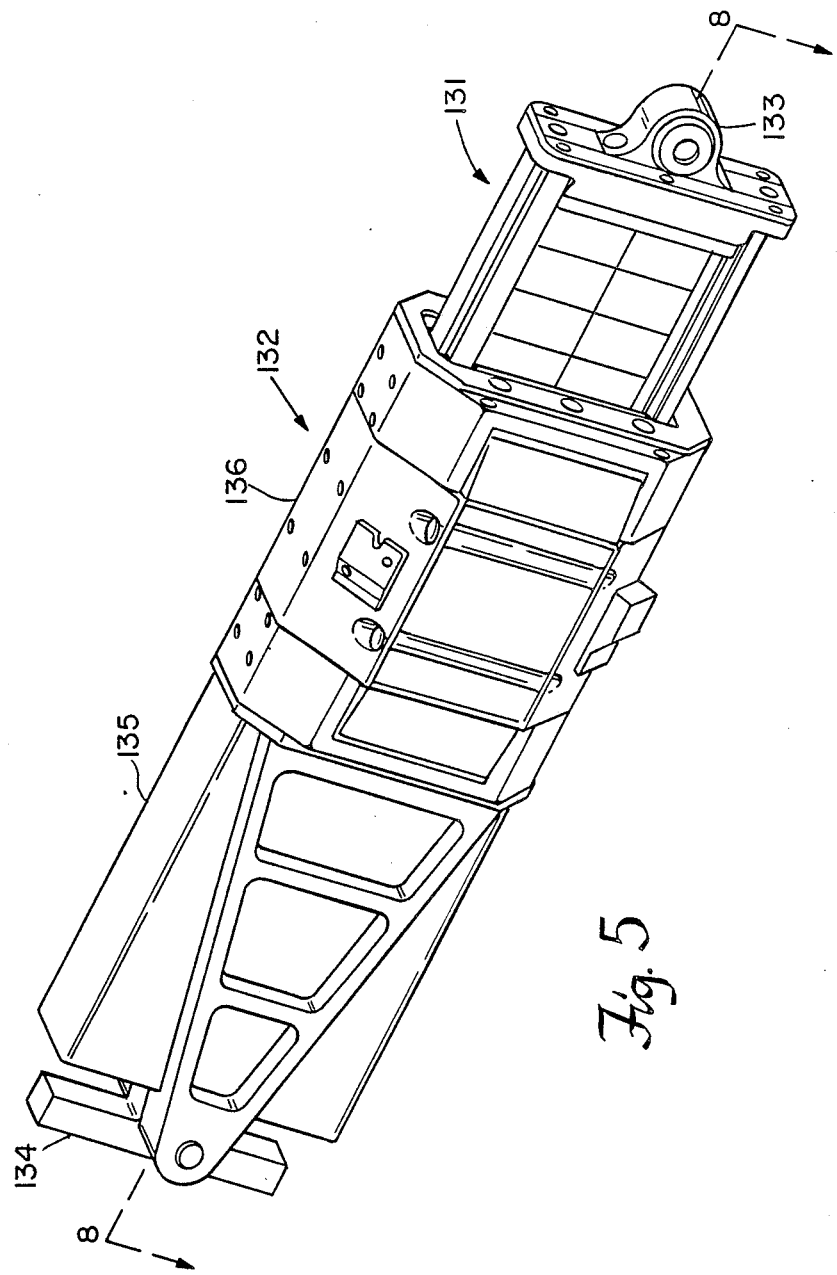
FIG. 5 is a perspective view of a linear actuator according to the invention.

Referring to FIG. 5, there is shown a perspective view of an exemplary embodiment of a linear motor according to the invention. This linear motor includes an inside member 131 of relatively low mass relatively movable with respect to an outside member 132. The exposed end of inside member 131 includes a bushing 133 connected to the unsprung mass, such as comprising the wheel assembly. Outside member 132 is pivotally connected at the end opposite bushing 133 to support member 134 attached to the sprung mass, such as the vehicle body. Dust cover 135 helps protect inside member 131 from dust.

Figure 6:
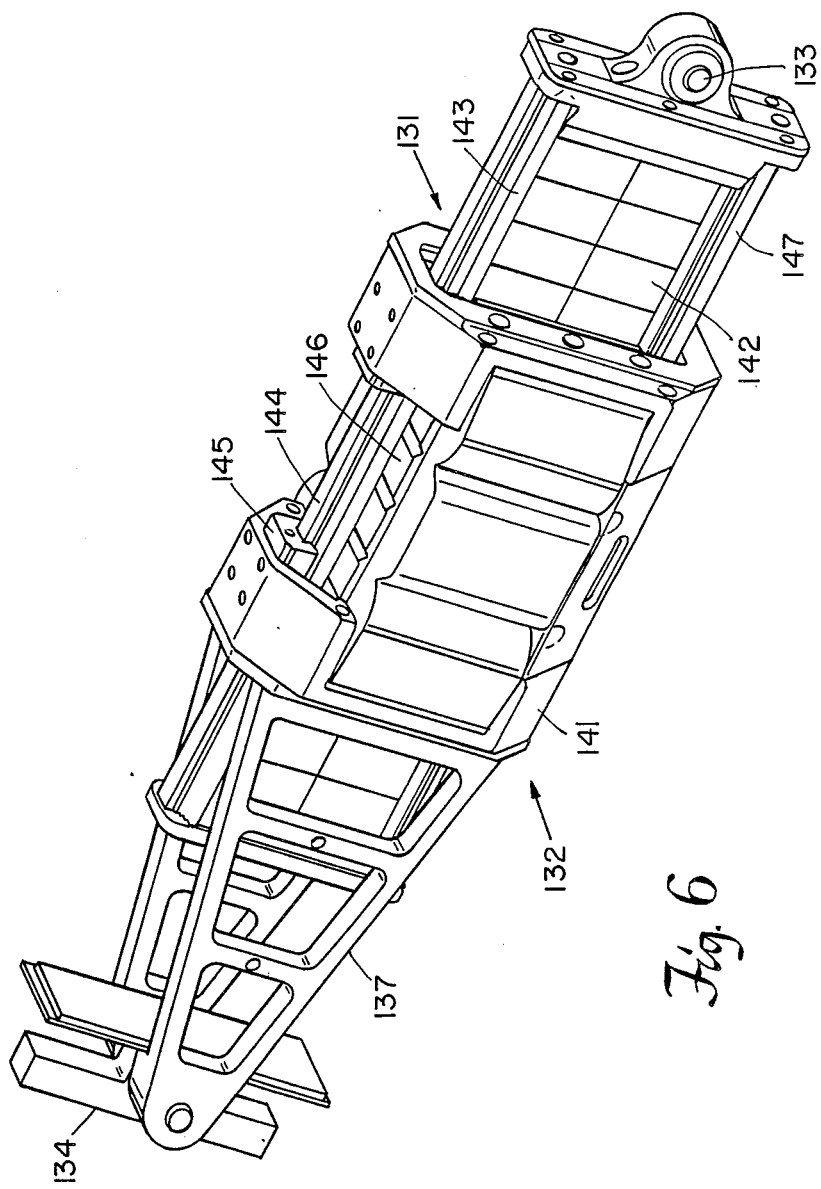
FIG. 6 is a perspective view of the linear actuator of FIG. 5.

Referring to FIG. 6, there is shown a perspective view of the linear motor of FIG. 5 with side cap 136 (FIG. 5) and most of dust cover 135 removed to expose additional structural details. Outside member mounting frame 137 is connected to outside member pole assembly 141. Inside member 131 includes a number of rectangular magnets such as 142 and a sensor magnet holder 143 related to position sensor 106. Outside member 132 also includes coils, such as 144, and linear bearings, such as 145, that engage a bearing rail, such as 146 and 147.

Figure 7:
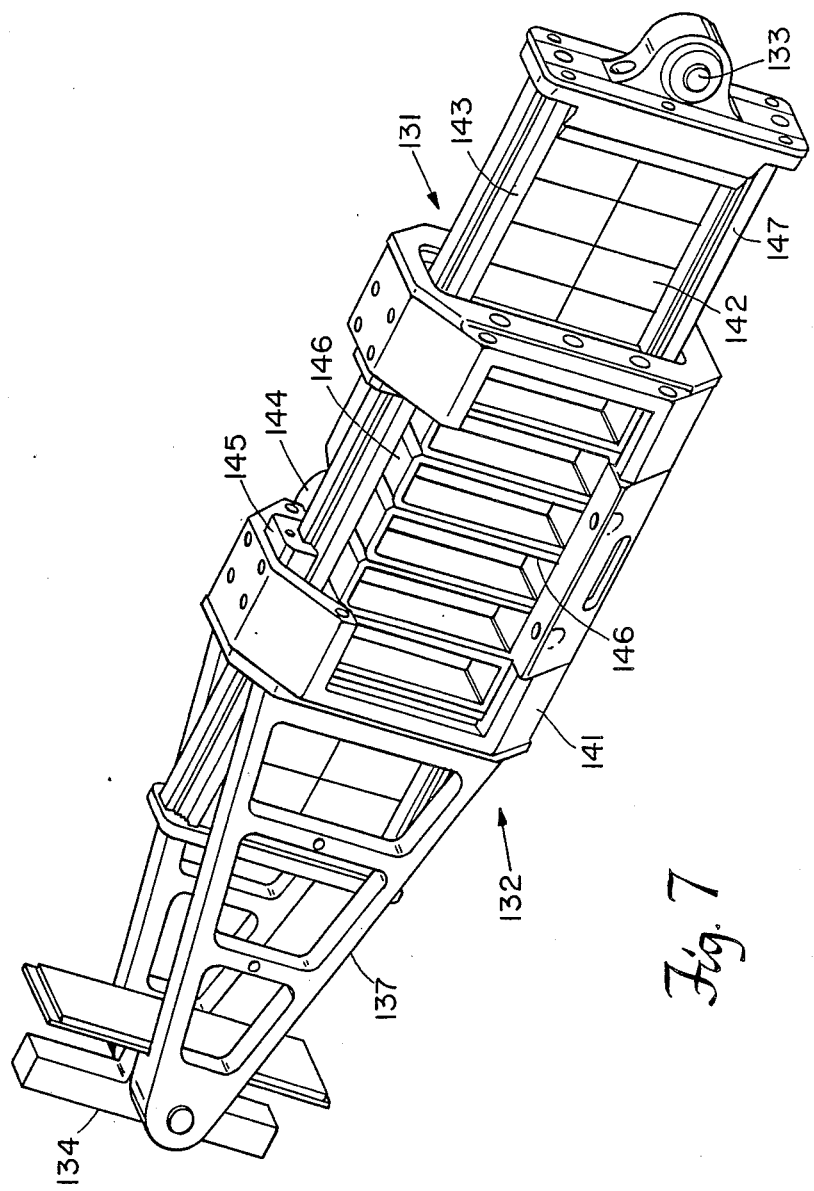
FIG. 7 is a perspective view of the linear actuator of FIGS. 5 and 6 but with the stator pole assembly also removed.

Referring to FIG. 7, there is shown a perspective view of the linear motor of FIGS. 5 and 6 with outside member pole assembly 141 also removed to illustrate the coils such as 146.

Figure 8:
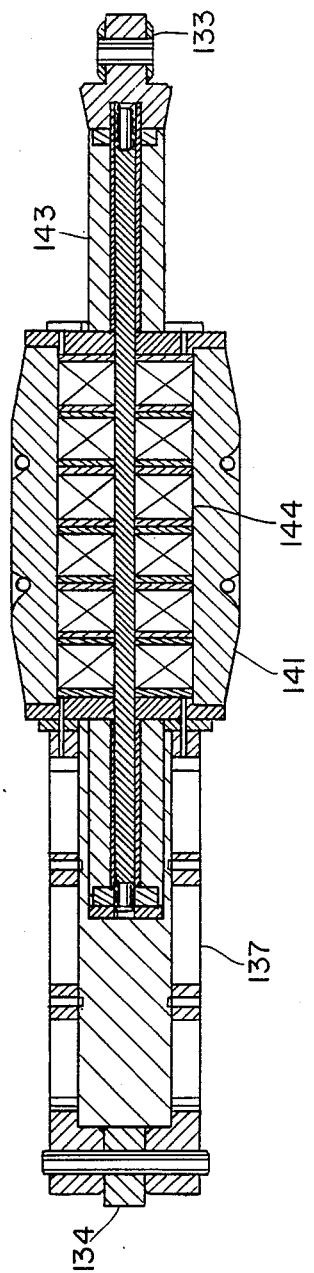
FIG. 8 is a sectional view of the linear actuator of FIG. 5.

Referring to FIG. 8 there is shown a view through section 8—8 of FIG. 5.

This embodiment of a linear motor has a number of features and advantages. The relative force between inside member 131 and outside member 132 is related to the magnitude and polarity of the currents in the coils. The linear motor may thus be regarded as a source of electrically controllable relative force between sprung and unsprung masses.

Sensor magnet holder 143 preferably carries an array of contiguous permanent magnet elements with alternating magnetic polarity to facilitate using a magnetic pickup head to sense flux changes as relative displacement occurs between the inside and outside members. A Gray code arrangement provides a digital signal representative of the absolute displacement between inside and outside members relative to a reference position.

A feature of the invention is that motor 32 may at times function as a generator and convert mechanical work produced by relative movement between the suspended and unsuspended masses into electrical energy. This electrical energy is typically returned to the power supply for the switching amplifiers connected to the windings. These switching amplifiers typically include diodes across controllable power semiconductor switching devices such as transistors, FET's, IGBT's or SCR's so that energy may flow from motor 32 into the power supply through the shunting diodes. This feature effectively reduces the electrical power required to operate the system.

Another feature of the invention resides in the ability to short-circuit the windings and thereby allow linear motor 32 to function as a passive damper or shock absorber. It may be desirable to effect this mode of operation when the active suspension system is malfunctioning or it is desired to reduce electrical energy consumption. Short-circuiting may be effected by operating one or more relays having normally open contacts across the motor windings. Alternatively, the power supply for the switching circuits may be crowbarred so that current may flow through the shunting diodes and thereby effectively provide magnetic damping.

A feature of the inside and outside members is that there is core symmetry so that there is a neutral bearing force. Stated in other words, the first and second members are substantially symmetrical about a surface parallel to the path of relative motion therebetween. For example, for the specific structure shown in which the relative motion is linear, the first and second elements are substantially symmetrical about a plane midway between planes tangential to extreme broad surfaces of the members and parallel to the path of relative motion. This symmetrical structure helps minimize the relative force between the first and second members orthogonal to the path of relative motion, this orthogonal force being significantly less than the maximum relative force between the first and second members in a direction along the path. Typically this orthogonal force is very low and nearly zero.

Making the inside member composed predominantly of permanent magnets helps establish a high force-mass relationship while keeping the mass relatively low.

The use of a multiple phase system helps improve efficiency; that is, provides a relatively high ratio of mechanical work (force X distance) to input electrical energy.

Other embodiments are within the following claims.

What is claimed is:

1. In a vehicle comprising a chassis and at least one wheel assembly, said wheel assembly comprising a wheel support member, a damping mass, a damping spring for connecting said damping mass to said wheel support member, and a mechanical resistive means in parallel with said damping spring, suspension means connecting the wheel assembly to the chassis, said suspension means supporting the weight of a vehicle and isolating the wheel motion from the chassis motion, and at least one actuator means for providing force between said wheel assembly and said chassis, the improvement wherein said actuator means comprises an along-path controllable electromechanical transducer connected between said wheel assembly and said chassis, said along-path controllable electromechanical transducer capable of providing force between the wheel assembly and the chassis.

2. An improvement in accordance with claim 1 wherein said along-path electromechanical transducer is an along-path multipole motor.

3. An improvement in accordance with claim 2 wherein said along-path multipole motor has salient poles.

4. An improvement in accordance with claim 1 further comprising load-leveling means connected between said wheel assembly and said chassis, said load leveling means providing force between the wheel assembly and the chassis to compensate for the weight of the loaded vehicle.

5. An improvement in accordance with claim 4 wherein said load-leveling means comprises an air bag.

6. In a vehicle comprising a sprung mass and an unsprung mass, said unsprung mass comprising a wheel assembly and wheel support, the improvement comprising, a source of a control signal, an active suspension actuator for providing force between said sprung mass and a location on said wheel support near said wheel assembly, a suspension interconnecting the sprung and unsprung masses and having an along-path controllable electromechanical transducer for providing a controllable force between said sprung and unsprung masses in response to said control signal that for a constant control signal maintains a constant force independent of position or velocity between said wheel assembly and said sprung mass.

7. The improvement in accordance with claim 6 wherein said along-path controllable electromechanical transducer is an along-path multipole actuator.

8. The improvement in accordance with claim 7 wherein said along-path multipole electric actuator has salient poles.

9. The improvement in accordance with claim 6 and further comprising load-leveling means connected between said sprung and unsprung masses, said load leveling means providing a force between said sprung and unsprung masses to compensate for the weight of said sprung mass.

10. The improvement in accordance with claim 9 wherein said load-leveling means comprises an air bag.

11. An improvement in accordance with claim 1 wherein said along-path electromechanical transducer comprises a first member electromagnetically coupled to at least a portion of a second member, said first member and said second member being relatively slidable along said path said first member having at least one winding for establishing a magnetic field penetrating said second member, said second member including at least one element for carrying said magnetic field, whereby the magnitude and polarity of electric current in said winding is related to the relative displacement between said first member and said second member along said path.

12. An improvement in accordance with claim 11 wherein said first member includes a plurality of substantially contiguous windings each for producing a magnetic field having a significant component orthogonal to said path, said second member having a plurality of substantially contiguous permanent magnets of alternate polarity along said path for establishing a magnetic field that reacts with the first member field to produce force along said path.

13. An improvement in accordance with claim 11 and further comprising a position sensor for providing a position signal representative of the relative position along said path between said outside and inside members.

14. An improvement in accordance with claim 11 wherein said second member is inside said first member.

15. An improvement in accordance with claim 12 wherein said second member is inside said first member.

16. An improvement in accordance with claim 13 wherein said second member is inside said first member.

17. An electromechanical transducer comprising, first member electromagnetically coupled to at least a portion of a second member, said first member and said second member being relatively slidable along a path having spaced end points, said first member having at least one winding for establishing a magnetic field penetrating said second member, said second member including at least one element for interacting with said magnetic field, said first and second members being substantially symmetrical about a surface parallel to said path, wherein said first member includes a plurality of substantially contiguous windings each for producing a magnetic field having a significant component orthogonal to said path, and said second member has a plurality of substantially contiguous permanent magnets of alternate polarity along said path for establishing a magnetic field that reacts with the first member magnetic field to produce force along said path.

18. An electromechanical transducer in accordance with claim 17 wherein said second member comprises predominantly said plurality of substantially contiguous permanent magnets.

19. An electromechanical transducer in accordance with claim 18 wherein the mass of said second member is substantially the same as that of said contiguous permanent magnets.

20. An electromechanical transducer in accordance with claim 17 and further comprising a position sensor for providing a position signal representative of the relative position along said path between said first and second members.

21. An electromechanical transducer in accordance with claim 17 wherein said second member is inside said first member.

22. An electromechanical transducer in accordance with claim 18 wherein said second member is inside said first member.

23. An electromechanical transducer in accordance with claim 19 wherein said second member is inside said first member.

24. The improvement in accordance with claim 6 wherein said along-path controllable electromechanical transducer is multiple phase and further comprising,
 a source of multiple phase controllable electrical power coupled to and energizing said controllable electromechanical transducer.

25. In a vehicle comprising a sprung mass and an unsprung mass,
 the improvement comprising a suspension interconnecting the sprung and unsprung masses and having an along-path controllable electromechanical transducer for providing a controllable force between said sprung and unsprung masses
 wherein said electromechanical transducer comprises,
 a first member electromagnetically coupled to at least a portion of a second member,
 said first member and said second member being relatively slidable along a path having spaced end points,
 said first member having at least one winding for establishing a magnetic field penetrating said second member,
 said second member including at least one element for interacting with said magnetic field,
 said first and second members being substantially symmetrical about a surface parallel to said path.

26. An improvement in accordance with claim 25 wherein said first member includes a plurality of substantially contiguous windings for each for producing a magnetic field having a significant component orthogonal to said path,
 said second member having a plurality of substantially contiguous permanent magnets of alternate polarity along said path for establishing a magnetic field that reacts with the first member field to produce force along said path.

27. An improvement in accordance with claim 26 wherein said second member comprises predominantly said plurality of substantially contiguous permanent magnets.

28. An improvement in accordance with claim 27 wherein the mass of said second member is substantially the same as that of said contiguous permanent magnets.

* * * * *